3,312,560
AMYLOSE-DIGLYCEROL COMPOSITION
Henry M. Walton, Decatur, Ill., assignor to A. E. Staley Manufacturing Company, Decatur, Ill., a corporation of Delaware
No Drawing. Filed Apr. 24, 1964, Ser. No. 362,494
6 Claims. (Cl. 106—213)

This invention relates to amylose plasticized with diglycerol.

For years amylose films have been studied from a more or less academic point of view since amylose was not commercially available. Now that amylose has become available in sizable quantities research on amylose films has been accelerated. One of the major problems, which has slowed down the commercialization of amylose films, is that the flexibility and elongation of amylose films is dependent upon the water content of the amylose film. At low relative humidity the plasticizing effect of the water is lost due to the evaporation of water. The film becomes extremely brittle and its percent elongation decreases. Even at 50% relative humidity the film has a low percent elongation and poor flexibility.

Various attempts to find plasticizers for amylose have centered upon humectants, which would retain water at low relative humidity. Glycerol has generally been considered the best amylose plasticizer. However, glycerol is sadly deficient as an amylose plasticizer. At low relative humidity amylose films plasticized with glycerol have about the same elastic modulus and percent elongation as unplasticized amylose films. At about 50% relative humidity, such plasticized amylose films initial percent elongation and elastic modulus are markedly better than unplasticized amylose. However, the improvements imparted by humectants such as glycerol are only temporary. On aging the elastic modulus of amylose films plasticized with glycerol increases and percent elongation decreases to the point where the amylose film is not appreciably different from the unplasticized film.

The object of this invention is to provide an improved plasticizer for amylose films.

I have now found that diglycerol

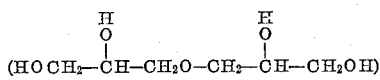

is an excellent amylose plasticizer which can be used in a weight ratio of amylose plasticizer to amylose (dry solids basis) of from about 5:95 to 60:40, when diglycerol is the sole plasticizer. Under most circumstances diglycerol is used in a concentration of from about 10 to 40 parts by weight with correspondingly 90 to 60 parts by weight amylose.

For the purposes of this invention, the term "amylose" refers to the amylose resulting from the fractionation of the amylose and amylopectin components of starch, or the whole starch which is composed of at least 50% amylose. Commercially available sources of amylose include "Nepol" amylose (the amylose fraction of corn starch), "Superlose" (the amylose fraction of potato starch), "Amylomaize" or "Amylon" (high-amylose corn starch containing approximately 54% amylose), "Amylon VII" (high-amylose corn starch containing up to 70% amylose), etc. The amylose films based on high-amylose corn starch can be simulated by mixing corresponding concentrations of separated amylose with separated amylopectin. Preferably, the amylopectin content of the amylose is less than 20% by weight. In general, the higher the concentration of amylose the better the tensile strength of the film. Various derivatives of amylose (amylose acetate, hydroxyethyl amylose and hydroxypropyl amylose) such as those described in U.S. Patent 3,038,895 can also be employed. Preferably, the amylose derivative can be dissolved in water and has a d.s. less than one.

The amylose films can be prepared by any of the prior art techniques, such as those described in any of U.S. Patents 2,608,723 to Wolff et al., 2,903,336 to Hiemstra et al., 2,973,243 to Kudera, 3,030,667 to Kunz, etc. In these processes the amylose plasticizer (in either the dry form or dissolved in water) is added to a suitable aqueous solution of amylose (in aqueous alkali, aqueous formaldehyde, in hot water at neutral pH, etc.). The amylose solution is then cast on a suitable substrate, such as a moving belt, or extruded into a coagulating (acidic or salt) bath. In this way the amylose film is recovered from the aqueous solution by the precipitation of the amylose film from the solvent or by evaporating the solvent.

These techniques can be employed to prepare self-supporting films, which are large (100 times or more) in two dimensions and small in the third dimension. The previously prepared films can also be laminated onto a suitable base or the film can be cast directly onto a suitable substrate, e.g., cellulose (paper), metal, etc.

The amylose film can also be prepared by extruding amylose and diglycerol in the presence of a little water. This extrusion technique is described in detail in commonly assigned application Ser. No. 244,127, filed Dec. 12, 1962.

The following examples are merely illustrative and are not to be construed as limiting the scope of my invention.

Example I

An aqueous solution of corn amylose was prepared by passing an aqueous slurry of 7.2 grams corn amylose (d.s.b.) and 0.8 grams corn amylopectin (d.s.b.) in 72 grams of water through a 35 foot long coil heated to 150° C. having an inside diameter of 1/8" and a dwell time of 2 minutes. The aqueous solution was cooled to 95° C. and placed in a preheated Dewar flask, which contained two grams of diglycerol in 18 grams water (95° C.). The solution was stirred for 60 seeconds and then cast on a lecithin-coated glass plate at 30° C. using a doctor blade preheated to 95° C. The film gelled rapidly at room temperature. The same technique was employed for preparing an amylose film having no plasticizer and an amylose film having 20% glycerol. Each film was stripped from the glass plate and stored at 23° C. and 50% relative humidity. The percent elongation and elastic modulus of the film were determined periodically. The results are set forth below in Table I where E.M. stands for elastic modulus in p.s.i. and E. stands for percent elongation.

TABLE I

| Properties Tested | Plasticizer | Thickness of Film in Mils | Age of Film in Weeks | | |
|---|---|---|---|---|---|
| | | | 1 | 2 | 4 |
| E.M. | None | 1.0 | 501,000 | | 500,000 |
| E. | | | 7 | | 7 |
| E. M. | Glycerol | 0.9 | 132,000 | 153,000 | 223,000 |
| E. | | | 19 | 14 | 4 |
| E. M. | Diglycerol | 1.0 | 141,000 | 121,000 | 147,000 |
| E. | | | 25 | 27 | 21 |

The above data illustrates that the plasticizing effect of diglycerol is retained as the amylose film ages. This is in direct contrast to the plasticizing effect of glycerol, which is normally considered the best amylose plasticizer.

Example II

This example illustrates the plasticizing effect of diglycerol at low humidity. Example I was repeated using 20% by weight, 30% by weight and 40% by weight diglycerol and 20% by weight and 30% by weight of glycerol. The elastic modulus and percent elongation of the films were determined after storing the films at 23° C. and 20% relative humidity for 1 week. The results are set forth below in Table II.

TABLE II

| Properties Tested | Plasticizer | Weight Percent Plasticizer in Film | | |
|---|---|---|---|---|
| | | 20% | 30% | 40% |
| E. M. | Diglycerol | 150,000 | 70,500 | 32,500 |
| E. | | 21 | 35 | 50 |
| E. M. | Glycerol | 367,000 | 221,000 | } Not run. |
| E. | | 8 | 7 | |

The above data illustrates that diglycerol is a markedly better plasticizer for amylose than glycerol at low humidity.

Since many embodiments of this invention may be made and since many changes may be made in the embodiments described, the foregoing is to be interpreted as illustrative only and my invention is defined by the claims appended hereafter.

I claim:

1. A continuous amylosic film comprising an amylosic material containing at least 50% by weight amylose wherein the amylose portion of said amylosic material is present in the form of a material selected from the group consisting of the separated amylose fraction of whole starch, whole starch containing at least 50% by weight amylose and mixtures thereof plasticized with a plasticizing concentration of diglycerol.

2. The article of claim 1, wherein the parts by weight ratio of diglycerol to amylosic material ranges from 5:95 to 60:40.

3. The article of claim 2, wherein the amylosic material is the separated fraction of whole starch.

4. A composition comprising an amylosic material containing at least 50% by weight amylose wherein the amylose portion of said amylosic material is present in the form of a material selected from the group consisting of the separated amylose fraction of whole starch, whole starch containing at least 50% by weight amylose and mixtures thereof plasticized with a plasticizing concentration of diglycerol.

5. The composition of claim 4, wherein the parts by weight ratio of diglycerol to amylosic material ranges from 5:95 to 60:40.

6. The composition of claim 5, wherein the amylosic material is the separated fraction of whole starch.

References Cited by the Examiner

UNITED STATES PATENTS

| | | | |
|---|---|---|---|
| 2,550,213 | 4/1951 | Young | 106—210 |
| 2,608,723 | 9/1952 | Wolff et al. | 106—213 |
| 3,117,014 | 1/1964 | Klug | 264—211 |
| 3,243,308 | 3/1966 | Barger et al. | 106—213 |

ALEXANDER H. BRODMERKEL, *Primary Examiner.*

MORRIS LIEBMAN, *Examiner.*

D. J. ARNOLD, *Assistant Examiner.*